United States Patent Office 3,329,806
Patented July 4, 1967

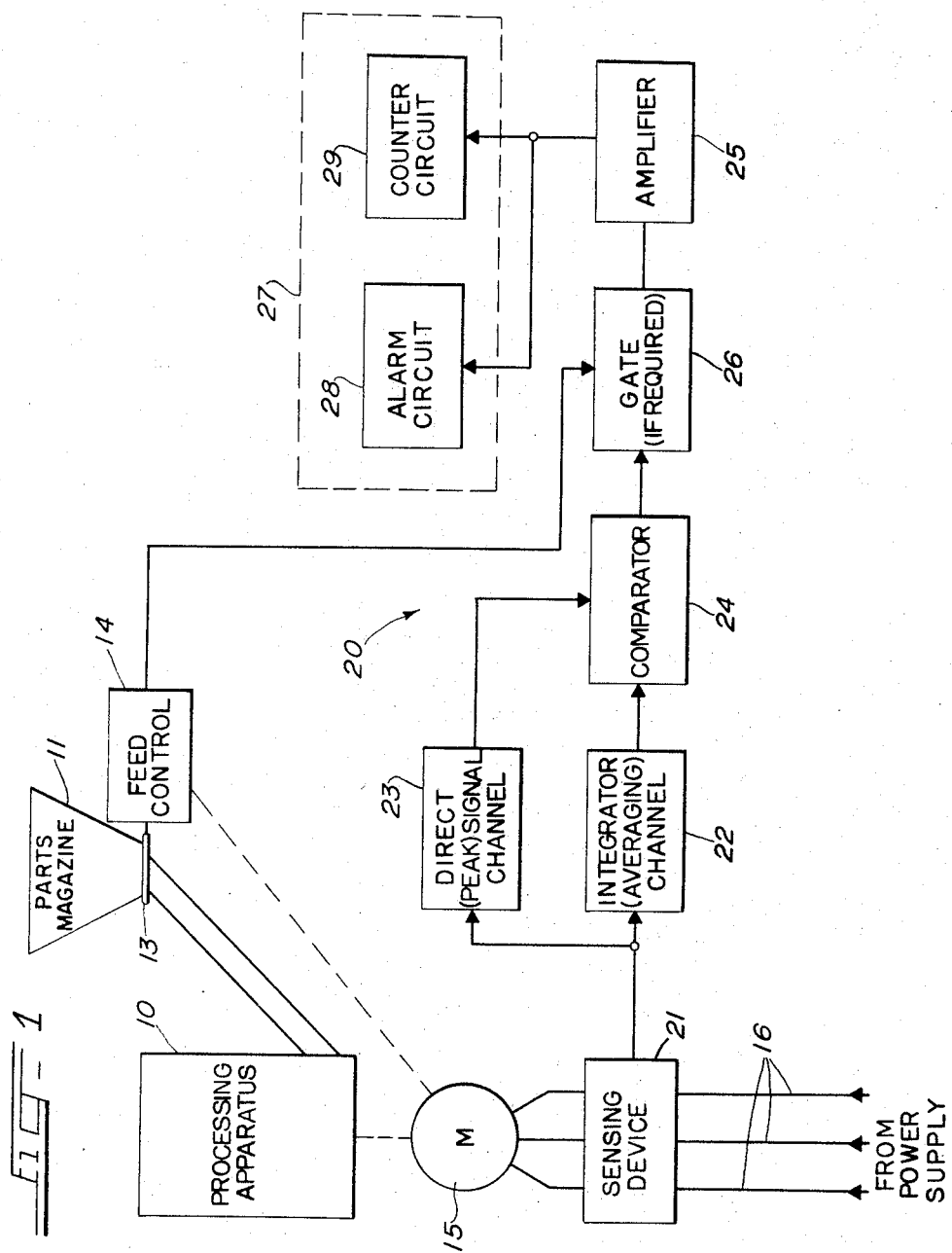

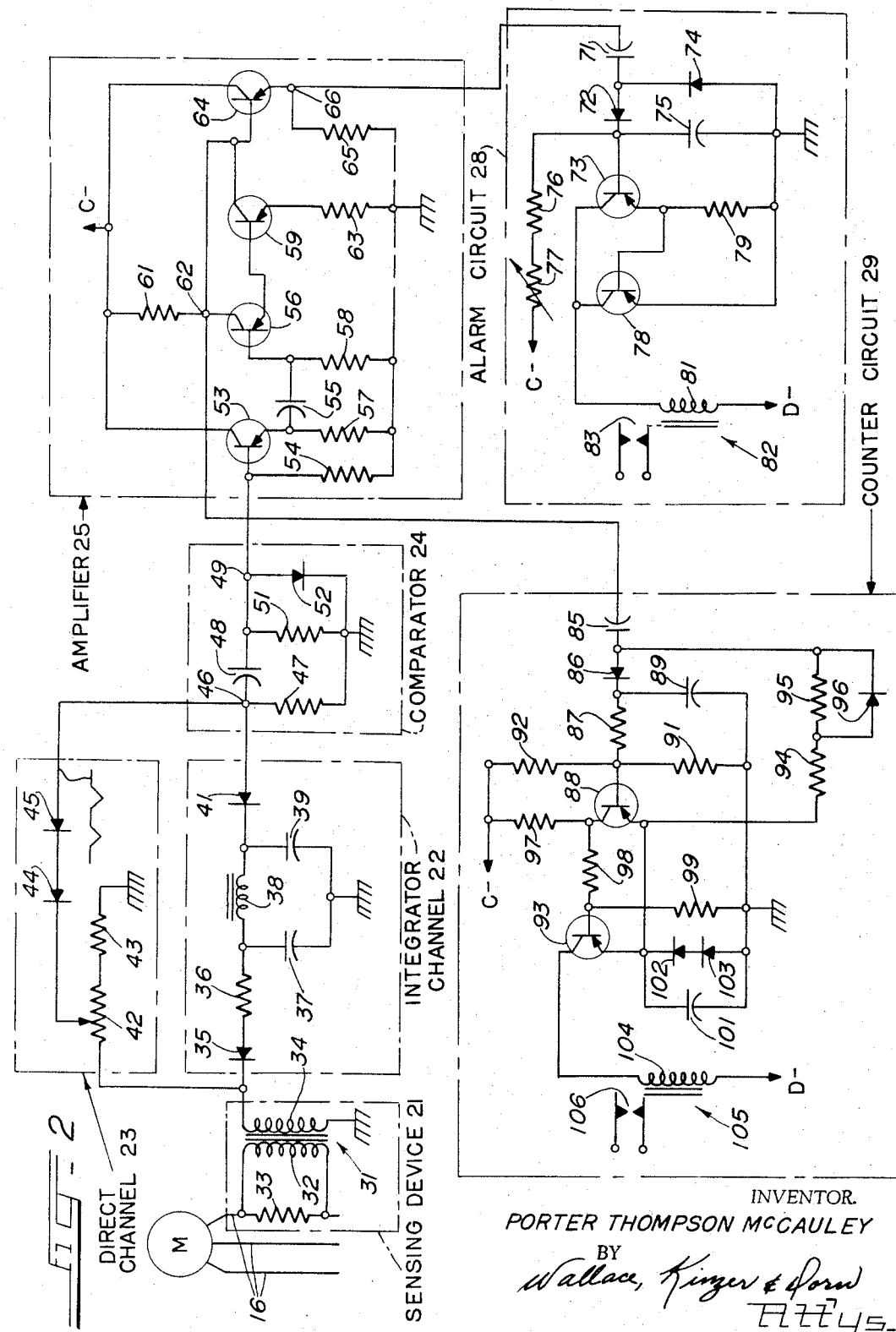

3,329,806
MONITORING CIRCUITS
Porter Thompson McCauley, Winnetka, Ill., assignor to Microdyne, Inc., Wheeling, Ill., a corporation of Illinois
Filed Nov. 8, 1963, Ser. No. 322,416
4 Claims. (Cl. 235—92)

ABSTRACT OF THE DISCLOSURE

A parts-feed monitoring circuit for monitoring the feeding of parts to electrically driven process apparatus, such as a punch press, subject to brief changes in loading during each actual operation. A sensing transformer develops a signal representative of such loading changes; this signal is integrated in one signal channel and is used to develop a peak amplitude signal in another signal channel. The outputs of the two signal channels are compared to determine whether parts are actually being processed, developing a control signal that actuates an alarm or other control device when feeding of parts fails.

---

This invention relates to a new and improved circuit for continuously monitoring the processing of individual parts, elements, or other members in a variety of different forms of process apparatus; the invention is particularly advantageous as applied to the monitoring of feeding of individual parts to automatic or semi-automatic machine tools or generally similar forms of process apparatus and is described hereinafter particularly in conjunction with the surveillance of parts fed into an automatic machine tool.

With increasing automation, a wide variety of different forms of process apparatus have gone into use in the manufacture of individual parts and devices fabricated from metal, plastic, and other materials. In a typical instance, individual parts requiring threads are fed automatically from a storage hopper or other parts magazine into an automatic thread roller. Each part fed to the automatic thread roller is rolled to form the necessary thread and is discharged from the machine, presumably being followed immediately by another part to be threaded. But the parts feed mechanism for a process apparatus of this general kind may frequently be subject to jamming. Moreover, in many instances it is quite difficult to determine, by visual inspection, the occurrence of a failure in the parts feed mechanism.

Regardless of the form of the process apparatus, whether it be a machine tool, an automatic punch press, or other apparatus, it is usually possible to modify the process apparatus itself to afford some means for determining whether a part or blank has been fed to the machine in each process cycle. Custom-fitting of a monitoring device to each such apparatus, however, entails substantial expenditures of engineering time and money. Where direct sensing of the parts, as fed, is required, is it usually difficult and sometimes impossible to adapt a monitoring device quite suitable and effective with one form of process apparatus to an even slightly different form of process apparatus, or to the same apparatus using a different form of automatic feed mechanism.

It is a principal object of the present invention, therefore, to provide a new and improved parts-feed monitoring circuit for continuously monitoring the feeding of parts to a process apparatus such as an automatic machine tool, an automated punch press, or the like, that accurately and effectively monitors the continuing feed of parts to the apparatus without requiring the direct sensing of movement of the parts or, indeed, any direct connection to the process apparatus per se.

Another object of the invention is to provide a parts-feed monitoring circuit, for continuously monitoring the feeding of parts to automatic or semi-automatic process apparatus, that is applicable to a wide variety of forms of process apparatus and that is substantially independent of the mechanical construction of the process apparatus itself. A related object of the invention is to provide for continuous monitoring of an automated parts-feed mechanism for process apparatus in response to changes in some variable parameter of the process apparatus that can be readily sensed without modification of the process apparatus itself, such as the loading of the drive for the process apparatus.

Another important object of the invention is to obtain substantial operational immunity from environmental factors, such as variations in temperature, fluctuations in line voltage, frictional loading, and the like, in an automatic and continuous monitoring device for maintaining surveillance of feeding of parts to automated process apparatus.

A related object of the invention is to provide a new and improved continuous monitoring circuit, for monitoring the feeding of parts to automated process apparatus, that effectively and accurately maintains a count of the parts actually fed to the process apparatus and at the same time performs a useful control function by signaling any failure, regardless of cause, in the parts feed.

In this specification, and in the appended claims, the term "parts" is used generically to refer to any form of component part, complete device, or other member that is the subject of machining, punching, or other operations in an automated or semi-automated process apparatus.

Accordingly, the present invention is directed to a parts-feed monitoring circuit for monitoring the feeding of parts to a process apparatus that is subject to a short-duration change in a given operating parameter upon actual processing of a part; typically, this parameter may be the loading of an electrical drive circuit for the process apparatus. The monitoring circuit comprises sensing means for developing a sensing signal in response to the aforementioned operating parameter of the process apparatus. The sensing signal is applied to first and second signal transmission channels; the first signal transmission channel is an integrating channel that integrates the sensing signal over an appreciable time interval to develop a first comparison signal representative of the average amplitude of the sensing signal. The second signal transmission channel, on the other hand, is a direct channel that develops a second comparison signal representative of the peak amplitude of the sensing signal. These two comparison signals are applied to comparator means that compares the two signals and develops a control signal representative of differences therebetween and thus is indicative of actual processing of individual parts by the process apparatus. The control signal is applied to suitable control means which may include an alarm circuit, a counter circuit, or other control devices for utilizing the control signal in the control of the process apparatus.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

In the drawings:

FIG. 1 is a schematic block diagram of a parts feed monitor circuit constructed in accordance with one embodiment of the present invention, showing the circuit as applied to a given process apparatus; and FIG. 2 is a detailed circuit diagram of the principal operating circuits for the parts-feed monitoring circuit of FIG. 1.

The schematic block diagram, FIG. 1, illustrates in generalized form a conventional automatic or semi-automatic process apparatus 10 that is provided with an automatic parts feed mechanism including a storage magazine 11 and a feed chute or conveyor 12. A gate 13 may be provided at the outlet of the magazine 11 to control the feeding of individual parts to be transferred into the chute 12. Gate 13 may be actuated by a conventional feed control 14. The process apparatus 10 and its feed mechanism control 14, in the illustrated system, are both driven from a main drive motor 15 that is connected to a suitable A.C. power supply as by the lines 16.

The particular process that is carried out by process apparatus 10 is not critical with respect to the present invention. Thus, apparatus 10 may constitute an automatic machine tool such as an automatic screw machine, automatic thread roller, automated drill or milling machine, or the like. The particular form of conveyor or chute utilized to convey blank parts or other elements to the apparatus from the magazine 11 is also unimportant insofar as the present invention is concerned.

With respect to the process apparatus 10, however, it is essential that the apparatus be subject to a short-duration change in some particular operating parameter when the apparatus actually processes a given part. In the form of the invention described in detail in connection with FIG. 2, the operating parameter selected for control purposes is the load current of the drive motor 15. However, control may be based on changes in the operating voltage of the drive motor, or upon some other operating parameter of the process apparatus, so long as there is a reasonably convenient and effective means for sensing changes in the selected operating parameter.

The parts-feed monitoring circuit 20 illustrated in FIG. 1 includes a sensing device 21, which in this instance is coupled to one of the power lines 16 of drive motor 15. Sensing device 21, which may constitute a simple current or voltage transformer, is employed to develop a sensing signal that is instantaneously representative of the selected operating parameter of the process apparatus 10. In this instance, the sensing device 21 develops a sensing siganl having an amplitude that varies directly with the input current to the process apparatus drive motor 15.

Monitoring circuit 21 further includes a signal transmission channel 23. The two signal transmission channels 22 and 23 are coupled to the sensing device 21, and the output of each channel is coupled to a comparator circuit 24. The first signal transmission channel 22 is an integrating or averaging channel that integrates the sensing signal from device 21 over an appreciable time interval and thus develops a first comparison signal that is representative of the average amplitude of the sensing signal. The second signal channel 23, on the other hand, is a direct transmission channel that produces a second comparison signal varying in accordance with the peak amplitude of the sensing signal from device 21.

The output of the comparator circuit 24 is coupled to an amplifier circuit 25. In some instances, it may be desirable to interpose a gate circuit 26 between the comparator 24 and the amplifier 25, as described more fully hereinafter, the gate 26 being controlled from the parts feed control 14 for the process apparatus. The output from amplifier 25 is coupled to a control means 27 which, in this instance, includes an alarm circuit 28 and a counter circuit 29. The control means 27 may also include direct control circuits connected back to process apparatus 10 or to its drive motor 15, as discussed more fully hereinafter.

As noted above, the two comparison signals produced by signal transmission channels 22 and 23 are significantly different from each other. The comparison signal produced by the integrating channel 22 represents the average of the sensing signal from the sensing device 21, over a substantial time interval. The output or comparison signal from channel 23, on the other hand, is proportional to the instantaneous peak current going to the drive motor 15. These two comparison signals are additively combined, in comparator circuit 24, to produce a control signal that is indicative of the actual processing of individual parts by the process apparatus 10.

In operation, with the process apparatus 10 functioning normally, the relative amplitudes of the outut signals from channels 22 and 23 are adjusted, with respect to each other, so that the peak signal from channel 23 is equal to or slightly less than the integrated or averaged comparison signal from channel 22. When each individual part is fed to the process apparatus 10, the short-term increase in current to drive motor 15, caused by the rolling of a thread, punching, machining, or other operation on the part in the process apparatus 10, causes the instantaneous peak signal from channel 23 to exceed the amplitude of the integrated signal from channel 22. As a consequence, an output signal is produced by comparator 24, representative of the instantaneous difference in amplitudes of the two comparison signals from channels 22 and 23 and directly indicative of the process of a part in apparatus 10.

The output signal from comparator 24 is supplied to amplifier 25, and from the amplifier to counter circuit 29 and alarm circuit 28. In counter circuit 29, the signal is employed to actuate a conventional mechanical or electrical counter device, affording a continuing check on the number of parts processed in apparatus 10. Of course, in any given operating cycle of apparatus 10 in which no part is fed through channel 12 to the process apparatus, there will be no appreciable change in the current to drive motor 15 and no substantial differential will be produced in the relative amplitudes of the two comparison signals developed by transmission channels 22 and 23. Consequently, no control signal will be produced by the comparator; hence, counter circuit 29 maintains a continuing and accurate count of parts actually processed.

Alarm circuit 28 is preferably constructed to have a relatively long time constant and is held in an inactive state, over an appreciable time interval, by each control signal impulse applied thereto from amplifier 25. Whenever there is a failure of the parts feed to process apparatus 10, there is a corresponding interuption in the control signal applied to the alarm circuit, just as in the case of counter circuit 29. Consequently, each time there is a failure of the parts feed, alarm circuit 28 is actuated to inform the machine operator that such a failure has occurred and that the process apparatus 10 requires attention. In the illustrated arrangement, alarm circuit 28 is actuated on any failure of parts to feed, regardless of whether the failure is caused by a jam in the feed apparatus or by a lack of further parts in storage magazine 11.

Because the sensing device 21 is not directly connected to the process apparatus 10 or to the parts feed comprising members 11–14, monitoring circuit 20 can be employed with a wide variety of different forms of process apparatus without requiring substantial modification of the process apparatus or the monitoring circuit. In fact, monitoring circuit 20 is essentially independent of the mechanical construction of process apparatus 10 and can be utilized without change for such different forms of process apparatus as automated machine tools, punch presses, molding presses, and the like. At the same time, the monitoring circuit is quite independent of variable environmental factors such as line voltage fluctuations, changes in ambient temperature and changes in frictional loading of the apparatus. This advantage of the invention is achieved by utilization of the dual channel comparator arrangement comprising circuits 22, 23 and 24. Thus, the control signal output from comparator 24 is based only on the differential between the average signal output (the comparison signal from channel 22) and the peak signal output (the comparison signal from circuit 23). The absolute magnitudes of these two comparison signals change together, so that the net output signal, the control signal from comparator 24, is essentially constant except for the short-time variations caused by actual processing of parts in process apparatus 10.

In some forms of process apparatus, particularly where relatively large parts are processed, actuation of the feed control 14 may cause loading of the drive motor 15 that is comparable in amplitude to the loading caused by the processing of parts in the apparatus 10. To avoid erroneous operation under these conditions, the gate circuit 26 may be incorporated in the monitoring system 20 to prevent translation of a control signal caused by operation of the feed mechanism and the resulting effect upon the load current drawn by the drive motor 15. Where a gravity feed is employed, or the feed mechanism does not cause appreciable loading of the drive motor for the process apparatus, the gate circuit 26 is superfluous and may be eliminated.

FIG. 2 illustrates, in full detail, the principal operating circuits for the parts feed monitoring circuit 20 of FIG. 1. In the circuit arrangement illustrated in FIG. 2, the sensing device 21 constitutes a step-up transformer 31 having a primary winding 32 connected across a relatively small resistor 33, the resistor 33 being connected in series with one of the power lines 16 for the process apparatus drive motor 15. The secondary winding 34 of the sensing transformer 31 has one terminal 40 connected to the signal transmission channels 22 and 23, the other terminal of the winding 34 being returned to system ground.

In FIG. 2, integrator channel 22 includes a resistor 36 that is connected in series with a diode 35 to the output terminal 40 of the secondary winding 34 of sensing transformer 31. Resistor 36 constitutes a part of an integrating circuit that also includes a capacitor 37 connected from the resistor to system ground. The integrating circuit further includes an inductance 38 in series with the resistor 36 and a further capacitor 39 connected from the other end of the inductance coil to system ground. An additional diode 41 is incorporated in series with inductance coil 38 in the output circuit of the integrator channel 22.

The direct signal transmission channel 23 comprises a potentiometer 42 and a fixed resistor 43 connected from the sensing transformers secondary winding 34, in series with each other, to ground. The variable tap on the potentiometer 42 is connected through two series diodes 44 and 45 to the input terminal 46 of the comparator circuit 24, terminal 46 also being connected to the diode 41 in the output of the integrator channel 22.

Comparator circuit 24 is quite simple in construction. It includes an input resistor 47 that is connected from the input terminal 46 to system ground. A capacitor 48 is utilized to couple the input terminal 46 of the comparator to the output terminal 49 thereof, the output terminal 49 being returned to system ground through the parallel combination of a resistor 51 and a diode 52.

Amplifier circuit 25, in the form illustrated in FIG. 2, constitutes a three stage amplifier. The first stage comprises a transistor 53 having a base electrode that is connected to the output terminal 49 of the comparator 24, the base electrode of transistor 53 also being returned to ground through a load resistor 54. This first stage of the amplifier circuit is an emitter follower, the collector of the transistor being connected directly to a suitable DC power supply designated as C— and the emitter electrode being coupled through a capacitor 55 to the base electrode of the first transistor 56 in the next stage of the amplifier. The emitter of the first stage transistor 53 is returned to ground through a suitable load resistor 57. The input resistor for the second stage is indicated by reference numeral 58.

The second stage of the amplifier 25, as shown in FIG. 2, employs the transistor 56 and a second transistor 59 in a conventional direct-coupled circuit arrangement, the emitter of transistor 56 being directly connected to the base electrode of transistor 59. The collector electrodes of transistors 56 and 59 are both returned to the C— supply through a suitable load resistor 61, the directly connected collectors affording a first output terminal 62 for the amplifier. The emitter of the second transistor 59 in this stage of the amplifier is returned to ground through a bias resistor 63.

The final stage in amplifier 25 is again an emitter follower. It comprises a transistor 64 having its base electrode connected to the common terminal 62 for the collector electrodes of the two transistors in the previous stage. The collector of transistor 64 is directly connected to the C— supply and the emitter is returned to ground through a load resistor 65. A second output terminal 66 for the amplifier is provided at the emitter of the final stage transistor 64.

Output terminal 66 of amplifier 25 is coupled, through a capacitor 71, to alarm circuit 28. The initial stage of the alarm circuit is a voltage doubler, comprising a diode 72 connected from capacitor 71 to the base electrode of a transistor 73, and a second diode 74 connected from the common junction of elements 71 and 72 to ground. The voltage doubler further includes a capacitor 75 that is connected from the base electrode of transistor 73 to system ground; the base electrode is also connected to the C— supply through a bias circuit comprising the series combination of a fixed resistor 76 and a variable resistor 77 that affords a means for adjusting the bias on the base electrode.

Transistor 73 is combined with a second transistor 78 in a simple and conventional direct-coupled amplifier. The collectors of the two transistors are directly connected to each other. The emitter of transistor 73 is connected to the base electrode of transistor 78 and is returned to ground through a resistor 79. The emitter of transistor 78 is grounded.

The collectors of the two transistors are returned to a DC power supply D— through a circuit including, in series, the operating coil 81 of a relay 82. Relay 82 may include suitable contacts 83 connected in an alarm circuit (not shown); the alarm circuit may include an audio alarm, a signal light, or any other alarm device. In addition, the relay contacts 83 can be incorporated in a control circuit for automatically shutting down the process apparatus 10 or any part thereof if this is required for safety purposes.

Counter circuit 29 is coupled, through a coupling capacitor 85, to the intermediate stage output terminal 62 of amplifier 25. The initial portion of counter circuit 29 comprises an integrating timing circuit that includes a diode 86 connected in series with a resistor 87 from the coupling capacitor 85 to the base electrode of a transistor 88. The timing circuit further includes a capacitor 89 that is connected from the common terminal of diode 86 and resistor 87 to ground. The input circuit to the transistor 88 includes a voltage divider comprising a resistor 91 connected from the base electrode of the transistor to ground and a resistor 92 connected from the base electrode to the C— supply.

Transistor 88 is incorporated in the first stage of a direct-coupled cascade amplifier that includes a second transistor 93. The emitter of transistor 88 is connected, by a biasing circuit, back to the common terminal of diode 86 and capacitor 85, the biasing circuit including two series connected resistors 94 and 95 with a diode in parallel with resistor 95. The collector of transistor 88 is returned to the C— supply through a resistor 97 and is connected to the base electrode of the second transistor 93 through a resistor 98. The base electrode of transistor 93 is also returned to ground through a load resistor 99.

The emitter of the second stage transistor 93 is connected directly to the emitter of the first transisor 88 and, accordingly, to the bias circuit 94–96. The emitters of the two transistors are also returned to ground through the parallel combination of a capacitor 101 and two series-connected diodes 102 and 103.

The output of the amplifier circuit in counter circuit 29 is taken from the collector of transistor 93. In the illustrated arrangement, the collector is connected to the DC supply D— through the operating coil 104 of a counter control relay 105. The contacts 106 of this relay may be connected in a suitable actuating circuit for a conventional solenoid-operated mechanical counter or other conventional electrically controlled counting apparatus.

As noted above, the sensing transformer 31 is a step-up transformer; in the illustrated arrangement, the transformer ratio is approximately 40:1. The alarm signal from the secondary winding 34 of the transformer is applied to the long-time-constant integrating circuit constituting signal transmission channel 22. This circuit charges up capacitor 39 to a DC voltage that is proportional to the average current going to the process apparatus drive motor 15.

The same signal from the high voltage winding 34 is supplied to the direct or peak signal channel 23. This channel also rectifies the AC sensing signal. But there is no integrating or averaging in the direct channel 23. Consequently, the second comparison signal developed by channel 23 is a rectified pulse signal that is directly proportional in amplitude to the instantaneous peak current to the motor 15.

Because the integration afforded by channel 22 is not perfect, and because the voltage drops across the various diodes 35, 41, 44 and 45 are not precisely uniform, it is usually necessary to adjust direct channel 23 to balance the output of that channel with the output of the integrating channel 22. Of course, the same adjustment could be effected in the integrating channel, but it is uusally more convenient to make the signal level adjustment in the direct channel 23. The potentiometer 42 should be adjusted so that the instantaneous amplitude of the pulse signal output from direct channel 23 is equal to or slightly less than the DC signal output from integrator channel 22.

The actual processing of each part, in process apparatus 10 (FIG. 1), momentarily increases the current drawn by drive motor 15. As a result, the instantaneous peak voltage developed across the transformer secondary 34 exceeds the average peak voltage for a short time interval. Hence, there are several cycles or pulses of the output signal from the second signal transmission channel, direct channel 23, that exceed the amplitude of the integrated DC output signal from channel 22, before the integrating channel can charge up to the new peak voltage. The comparison signals from the two channels are both applied to the common resistor 47 in the comparator 24, only the most negative output appearing across this particular resistor.

The DC voltage normally appearing across resistor 47, when the amplitudes of the two comparison signals from circuits 22 and 23 are approximately equal, is blocked by the capacitor 48. But the peak signal pulses occurring under unbalanced conditions, when a part is processed by apparatus 10, are translated through the capacitor 48 and applied to amplifier 25. It is thus seen that a short train of signal pulses, constituting the control signal output from comparator 24, is applied to amplifier 25 each time a new part is processed by process apparatus 10. Typically, each pulse train may include three to ten pulses.

Amplifier 25 is of essentially conventional construction and does not substantially modify the control signal, other than to increase its amplitude. Thus, each pulse train is applied to alarm circuit 28, after amplification, through the coupling capacitor 71.

The input circuit for alarm circuit 28 constitutes a long-time-delay RC circuit which charges up capacitor 75, in response to each pulse train, with such polarity as to cut off the output amplifier comprising transistors 73 and 78. In the absence of repetitive pulse train input signals, constituting the control signal as amplified by circuit 25, capacitor 75 discharges. The time required for discharge of the capacitor is dependent upon the circuit parameters and, in a typical instance, may be of the order of thirty seconds, depending upon the time required for an individual processing operation in process apparatus 10. That is, the time constant of the RC circuit should be slightly longer than the cycle time of process apparatus 10. When capacitor 75 is discharged, indicating a failure of the feeding of parts to the process apparatus, the amplifier 73, 78 is rendered conductive and energizes the operating coil 81 of alarm relay 82. As noted above, actuation of the relay may be employed to operate a signal light, an audio signal, or automatic control circuits for the process apparatus.

Counter circuit 29 also receives the amplified control signal pulse trains from amplifier 25. The initial portion of the counting circuit integrates each pulse train into a signal pulse of substantial duration; typically, the circuit time constant may be of the order of forty milliseconds. In any event, the time constant for the integrating circuit in the input to the emitter is made shorter than the normal cycle time of process apparatus 10. Thus, capacitor 89 is charged and discharged in response to each received control signal pulse train.

The amplifier circuit in counter circuit 29 is normally biased beyond cut off but is driven conductive by the discharge of capacitor 89 following each received pulse train. Each time the amplifier goes conductive, the counter relay 105 is actuated; conversely, when the amplifier is again cut off, the relay is deenergized. Thus, the relay 105 is actuated once in response to each received pulse train of the control signal supplied to emitter 29 and affords a reliable and accurate count of each part actually processed in apparatus 10.

In order to afford a more complete illustration of the present invention, detailed circuit parameters are set forth herein with respect to a specific embodiment constructed with the circuit shown in detail in FIG. 2. It should be understood that these circuit values are supplied solely by way of illustration and in no sense as a limitation on the present invention.

Resistors:

| | | |
|---|---|---|
| 36, 61, 65, 79 | kilohms | 1 |
| 42 | do | 50 |
| 43 | do | 220 |
| 47 | do | 390 |
| 51, 57, 95 | do | 33 |
| 54, 99 | do | 15 |
| 58 | do | 2.2 |
| 63 | ohms | 10 |
| 76 | kilohms | 82 |
| 77 | do | 500 |
| 87 | do | 4.7 |
| 91, 92 | do | 22 |

Resistors:
| | | |
|---|---|---|
| 94 | kilohms | 3.3 |
| 97 | do | 1.8 |
| 98 | do | 6.8 |

Capacitors:
| | | |
|---|---|---|
| 37 | microfarad | 0.47 |
| 39 | do | 40 |
| 48 | do | 0.1 |
| 55 | do | 20 |
| 71, 75, 85 | do | 100 |
| 89 | do | 5 |
| 101 | do | 0.01 |

Inductance: 38 _____ henries__ 8.5

Diodes:
| | |
|---|---|
| 35 | 1N3196 |
| 41, 44, 45 | 1N1095 |
| 52, 86, 96, 102, 103 | 1N625 |
| 72, 74 | 1N2069 |

Transistors:
| | |
|---|---|
| 53, 59, 64 | 2N395 |
| 56, 73, 78, 88, 93 | 2N1379 |

DC supply voltages:
| | | |
|---|---|---|
| C— | volts | —12 |
| D— | do | —18 |

Hence, while preferred embodiments of the invention have been described and illustrated, it is to be understood that they are capable of variation and modification, and I therefore do not wish to be limited to the precise details set forth but desire to avail myself of such changes and alterations as fall within the purview of the following claims.

I claim:

1. A parts-feed monitoring circuit for monitoring the feeding of parts to a process apparatus having a continuously operable AC drive subject to a short-duration change in loading upon actual processing of a part, said monitoring circuit comprising:

a sensing transformer, coupled to said AC drive, for developing an AC sensing signal representative of the loading of the process apparatus drive;

a first signal transmission channel, coupled to said sensing transformer, for integrating said sensing signal over an appreciable time interval to develop a first comparison signal representative of the average amplitude of said sensing signal;

a second signal transmission channel, coupled to said sensing means, for developing a second comparison signal representative of the peak amplitude of said sensing signal;

comparator means, coupled to said first and second signal transmission channels, for comparing said first and second comparison signals to develop a control signal representative of amplitude changes of said second comparison signal relative to said first comparison signal and hence indicative of actual processing of individual parts by said process apparatus;

and means for utilizing said control signal in the operation of said process apparatus.

2. A parts-feed monitoring circuit for monitoring the feeding of parts to process apparatus subject to a short-duration increase in a given operating parameter upon actual processing of a part, said monitoring circuit comprising:

sensing means for developing a continuous AC sensing signal instantaneously representative of said operating parameter of the process apparatus;

a first signal transmission channel, coupled to said sensing means, for rectifying and integrating said sensing signal over an appreciable time interval to develop a first DC comparison signal representative of the average amplitude of said sensing signal;

a second signal transmission channel, coupled to said sensing means, for rectifying said sensing signal to develop a second pulsating DC comparison signal representative of the peak amplitude of said sensing signal;

comparator means, comprising a common load resistor and a blocking capacitor coupled to said first and second signal transmission channels for adding said first and second comparison signals to develop a control signal comprising individual pulse trains each representative of an amplitude increase of said second comparison signal relative to said first comparison signal and hence each indicative of actual processing of an individual part by said process apparatus;

and means for utilizing said control signal in the operation of said process apparatus.

3. A parts-feed monitoring circuit for monitoring the feeding of parts to a cyclic process apparatus subject to a short-duration change in a given operating parameter upon actual processing of a part, said monitoring circuit comprising:

sensing means for developing a sensing signal having an amplitude instantaneously proportional to said operating parameter of the process apparatus;

a first signal transmission channel, coupled to said sensing means, for integrating said sensing signal over an appreciable time interval to develop a first comparison signal representative of the average amplitude of said sensing signal;

a second signal transmission channel, coupled to said sensing means, for developing a second comparison signal representative of the peak amplitude of said sensing signal;

comparator means, coupled to said first and second signal transmission channels, for comparing said first and second comparison signals to develop a control signal comprising individual pulse trains each representative of a substantial change in amplitude of said second comparison signal relative to said first comparison signal and hence each indicative of actual processing of an individual part by said process apparatus;

and utilization means for utilizing said control signal, said utilization means including an amplifier, an integrating circuit for integrating said control signal pulse trains over a time interval at least equal to the time required for each cycle of said process apparatus, and means for applying the integrated signal to said amplifier to maintain said amplifier in a given conductivity state as long as a new pulse train recurs in each cycle of said process apparatus.

4. A parts-feed monitoring circuit for monitoring the feeding of parts to a cyclic process apparatus subject to a short-duration change in a given operating parameter upon actual processing of a part, said monitoring circuit comprising:

sensing means for developing a sensing signal having an amplitude instantaneously proportional to said operating parameter of the process apparatus;

a first signal transmission channel, coupled to said sensing means, for integrating said sensing signal over an appreciable time interval to develop a first comparison signal representative of the average amplitude of said sensing signal;

a second signal transmission channel, coupled to said sensing means, for developing a second comparison signal representative of the peak amplitude of said sensing signal;

comparator means, coupled to said first and second signal transmission channels, for comparing said first and second comparison signals to develop a control signal comprising individual pulse trains each representative of a substantial change in amplitude of said second comparison signal relative to said first comparison signal and hence each indicative of actual processing of an individual part by said process apparatus;

and utilization means for utilizing said control signal, said utilization means including an integrating circuit for integrating each control signal pulse train, over a time interval shorter than the cycle time for said process apparatus, to develop an individual pulse signal representative of each part processed, and counter actuating means for actuating a counter in response to said individual pulse signals.

References Cited

UNITED STATES PATENTS

| 2,499,953 | 3/1950 | Herzog | 235—92 |
| 2,953,722 | 9/1960 | Willis | 317—27 |
| 3,179,850 | 4/1965 | Matthews | 317—36 |
| 3,242,320 | 3/1966 | Stout | 235—92 |

DARYL W. COOK, *Acting Primary Examiner.*

MAYNARD R. WILBUR, *Examiner.*

G. MAIER, *Assistant Examiner.*